M. C. OVERMAN.
TIRE.
APPLICATION FILED AUG. 5, 1912.
1,223,727.
Patented Apr. 24, 1917.
3 SHEETS—SHEET 1.
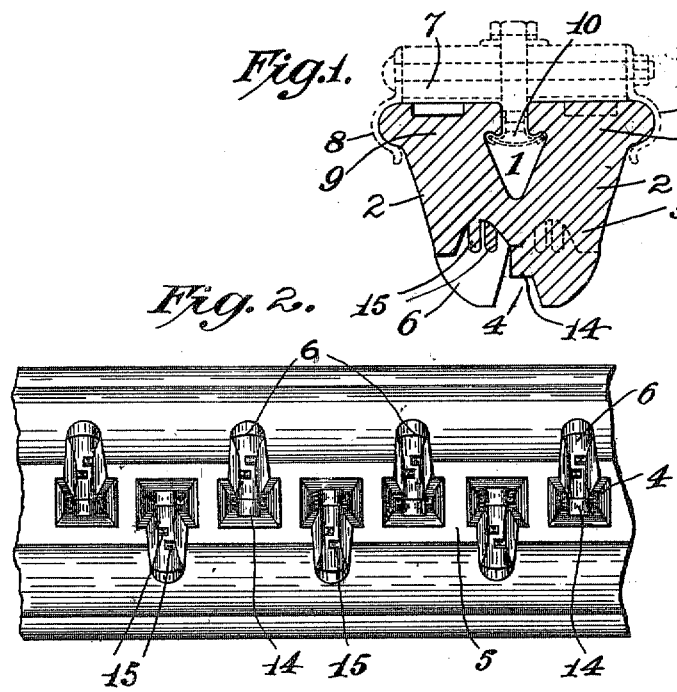
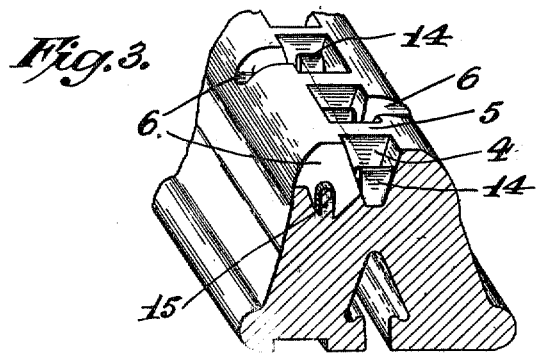

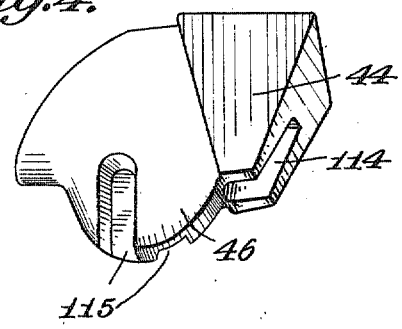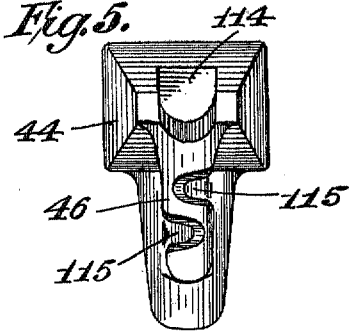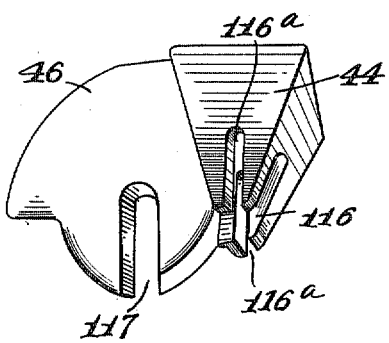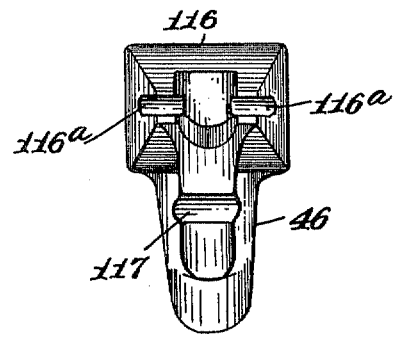

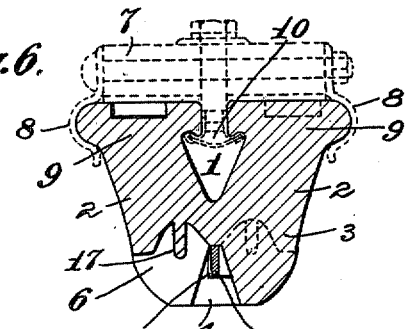

UNITED STATES PATENT OFFICE.

MAX CYRUS OVERMAN, OF NEW YORK, N. Y.

TIRE.

1,223,727.

Specification of Letters Patent. Patented Apr. 24, 1917.

Application filed August 5, 1912. Serial No. 713,295.

*To all whom it may concern:*

Be it known that I, MAX CYRUS OVERMAN, a citizen of the United States, residing at New York, in the county of New York and State of New York, have invented certain new and useful Improvements in Tires, of which the following is a specification.

My present invention relates to vehicle tires having deep clefts in their nose portion, and serves to prevent said clefts from picking up stones. Further, one form of my present improvement serves at the same time to tie together the parts of the nose separated by the clefts to make said parts tend to work together as a unit or entirety when the tire is running, but without impairing the flexibility of the nose sought to be produced therein by the clefts.

For the sake of illustration, the drawings show my improvements applied to tires of my own invention. In these drawings, which show only some of the specific forms which my improvements are adapted to take, Figure 1 is a vertical section through a tire within my invention provided with my present improvements; Fig. 2 is a plan view of a fragment of said tire on a larger scale; Fig. 3 is a perspective view of a fragment of the same tire; Fig. 4 is a perspective view on a still larger scale of one of the inserts or cores forming part of the mold by which the tire of the preceding figures is made; Fig. 5 is a plan view of the same core looking upwardly at Fig. 4; Fig. 6 is a view similar to Fig. 1 of a tire embodying another form of my present invention; Figs. 7 and 8 are views similar to Figs. 2 and 3 of the tire of Fig. 6; and Figs. 9 and 10 are views similar to Figs. 4 and 5 of a modified form of insert suitable for use in molding the tire of Figs. 6 to 8 inclusive.

I will now describe the devices shown in the drawings. The tire which I have chosen to illustrate the application of my improvements is like that of my co-pending application for United States Letters Patent Serial No. 658,495, filed November 4, 1911. Accordingly, a very brief description thereof will suffice. It is a cushion tire having a V-shaped longitudinal opening 1. Thick, substantially straight, load-supporting walls 2 converge steeply at the sides of this opening toward the tread. A deep nose portion 3 extends across the apex of said opening and across the lower ends of said walls, and has a bottom which is the tread of the tire and which delivers the vertical thrusts from the tread well under the side walls. The deep nose portion firmly upholds the side walls along with their load; and is given lateral and longitudinal flexibility, coöperating with that of the walls first by a deep tread groove or cleft 4 crossed at intervals by transverse webs 5 to prevent the two halves of the nose from being too flexible, much less flimsy, at the tread; and second, by the transverse clefts 6. These latter extend from the tread and the sides of the tread pockets or clefts 4, and thence upwardly well under the side walls of the tire, and also are seen to extend through the sides of the nose, but do so only near the tread, since otherwise the tendency is to make the halves of the nose too flexible laterally.

7 is the wheel felly, having flanges 8 at the sides of the base portion 9 of the tire. 10 is a transverse section of one of the clamping plates and bolts by which the longitudinally divided base portion of the tire over the top of the V-shaped opening is clamped to the felly.

Coming now to my present improvements, I prevent the deep clefts or sockets in the nose of my tire from picking up and retaining stones by providing projections within them which prevent the stones from lodging in the bottoms of the clefts.

In the tire of Figs. 1 to 3 inclusive, each pocket or cleft 4 under the longitudinal opening has a high projection 14 attached to the bottom and to the side of the pocket which is opposite to the transverse cleft 6. Further, in the same tire each transverse cleft has a pair of high projections 15 attached to the bottom and sides of the cleft and are preferably in staggered overlapping relation to each other as best shown in the plan view of Fig. 2.

Figs. 1 and 3 best show how the aforesaid projections 14 and 15 prevent stones from lodging in the bottom of any of the clefts.

In the tire of Figs. 1 to 4, each pocket or cleft under the longitudinal opening has a high projection 16 which is the same as the corresponding projection 14 in the other tire except that it is tied to the end walls of the cleft by webs 16ª extending lengthwise of the tread. In the same tire, each transverse cleft 6 has a projection 17 attached to the bottom and to the sides of the cleft across which it extends.

Figs. 6 to 8 best show how these modified forms of projections also keep stones out of the bottom of the clefts; and Fig. 7 shows in addition how they longitudinally tie together the parts 18 into which the clefts divide up the nose, so that said parts are caused to act or are carried along as a unit or entirety when they are in ground contact and the tire is running. One of the advantages is that they serve to limit the wearing off of the rear edges of the parts 18 which is the tendency when they are too flexibly connected in longitudinal direction.

Although it is not essential, I prefer to mold the herein described projections integrally with the tire at the same time that the tire itself is molded. For this purpose I suitably support around the tread of the mold as many cores as there are combined longitudinal and transverse clefts 4 and 6. Each of these cores has a shape corresponding to the reverse of a combined longitudinal and transverse cleft. Thus, Fig. 4 shows in perspective one of these cores for making the tire of Figs. 1 to 3. Barring the fact that this core is drawn on a much larger scale, it will be seen that its exterior corresponds with, or might fit into, the interior of the combined clefts 4 and 6 of the tire of Figs. 1 to 3. The part 44 of the core corresponds with cleft 4 of the tire; 46 of the core with cleft 6 of the tire; the grooves 115 with the projections 15; and the slot 114 with the projection 14. Fig. 5 is an underneath plan of the same core.

Figs. 9 and 10 are similar to Figs. 4 and 5 but differ in showing a core suitable for making the tire of Figs. 6 to 8. The parts thereof corresponding with the parts of the tire are as follows: 44 of the core corresponds with cleft 4 of the tire; 46 of the core with cleft 6; slot 117 with projection 17; groove 116 with projection 16; and slits 116a with the web 16a.

What I claim is:

1. A rubber vehicle tire having a tread made flexible by open cavities, and small projections in the cavities, each attached to the bottom and a side wall of the given cavity.

2. A rubber vehicle tire having a tread made flexible by open cavities, and small projections in the cavities, each attached to the bottom and a side wall of the given cavity, the projections on the opposite side walls of the same cavity being staggered so as not to abut against each other when the tire is in action.

3. A rubber vehicle tire having a tread made flexible by open cavities, and small projections in the cavities, each attached to the bottom and a side wall of the given cavity, the projections on the opposite side walls of the same cavity being staggered so as not to abut against each other when the tire is in action, and the projections from the one side wall extending across the given cavity substantially as far as the projections from the opposite wall.

4. A rubber vehicle tire having a tread made flexible by open cavities and small projections in the cavities, each attached to only one side wall of the given cavity, the projections on opposite side walls of the same cavity extending to the middle portion thereof, but being staggered so as not to abut against each other when the tire is in action.

In testimony whereof I affix my signature in presence of two witnesses.

MAX CYRUS OVERMAN.

Witnesses:
E. W. SCHERR, Jr.,
A. C. McDONNELL.